United States Patent [19]
Masciarelli, Jr.

[11] Patent Number: 6,120,185
[45] Date of Patent: Sep. 19, 2000

[54] BALL-TYPE ANTI-FRICTION DEVICE

[76] Inventor: Camillo Masciarelli, Jr., Marlboro, Mass. 01752

[21] Appl. No.: 09/088,414

[22] Filed: Jun. 1, 1998

[51] Int. Cl.[7] ....................................................... F16C 29/04
[52] U.S. Cl. ........................................ 384/49; 193/35 MD
[58] Field of Search .................................. 384/49, 99, 57; 16/26; 193/35 MD

[56] References Cited

U.S. PATENT DOCUMENTS

| | | |
|---|---|---|
| 2,671,242 | 3/1954 | Lewis . |
| 4,108,455 | 8/1978 | James . |
| 4,382,637 | 5/1983 | Blackburn et al. . |
| 4,459,909 | 7/1984 | Takagi . |
| 4,553,795 | 11/1985 | Takagi . |
| 4,660,994 | 4/1987 | Masciarelli . |
| 4,706,793 | 11/1987 | Masciarelli . |
| 4,732,490 | 3/1988 | Masciarelli . |

*Primary Examiner*—Lenard A. Footland
*Attorney, Agent, or Firm*—Kriegsman & Kriegsman

[57] ABSTRACT

A ball-type anti-friction device which has a housing, a ball cage mounted within the housing for movement relative to the housing between a lower inactive position and an upper active position. The ball cage contains a relatively large ball mounted on relatively small bearing balls so that when the ball cage is in the lower or inactive position, the large ball is below the top surface of the housing and when the ball cage is in the upper or active position, the ball extends above the top surface of the housing. In a first embodiment, the housing contains a double acting fluid drive system. The fluid drive system includes two fluid chambers and a piston connected to the ball cage. The piston is selectively actuated by selective pressurization of the two fluid chambers. In a second embodiment, the ball cage is actuated by a single acting fluid drive system. A piston is connected to the ball cage and is biased downwardly to normally maintain the ball cage and large ball in the lower or inactive position. The housing contains a single fluid chamber which, when pressurized, causes the ball cage and large ball to move to the active or upper position in opposition to the biasing means.

7 Claims, 4 Drawing Sheets

BALL-TYPE ANTI-FRICTION DEVICE

CROSS-REFERENCE TO RELATED APPLICATIONS

NOT APPLICABLE

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to an anti-friction device with the use with material handling equipment, such as conveyors, work benches, work stations, carts, feed stations, or any equipment in which it is desirable to be able to use ball-type anti-friction elements to provide for change of direction of an object, moving along a conveyor or to provide a table on which an object can be moved and rotated to a desired orientation. A typical ball-type anti-friction device includes a housing which contains a relatively large ball that is supported on a plurality of smaller balls which enable the larger ball to rotate in any direction. The larger ball and smaller balls are mounted in a ball cage which is movably mounted within the housing for positioning the larger ball in either an inactive position in which the larger ball is below the upper surface of the housing and in an active position in which the larger ball extends above the upper surface of the housing. The movement of the ball cage is controlled by fluid drive means and biasing means.

An object of the present invention is the provision of a ball-type anti-friction device which has an improved actuating system for selectively positioning the larger ball in its lowered inactive position or in its raised active position.

BRIEF SUMMARY OF THE INVENTION

The present invention consists of ball-type anti-friction device which has a housing, a ball cage mounted within the housing for movement relative to the housing between a lower inactive position and an upper active position. The ball cage contains a relatively large ball mounted on relatively small bearing balls so that when the ball cage is in the lower or inactive position, the large ball is below the top surface of the housing and when the ball cage is in the upper or active position, the ball extends above the top surface of the housing.

In a first embodiment of the invention, the housing contains a double acting fluid drive system. The fluid drive system includes two fluid chambers and a piston connected to the ball cage. The piston is selectively actuated by selective pressurization of the two fluid chambers.

In a second embodiment of the invention, the ball cage is actuated by a single acting fluid drive system. A piston is connected to the ball cage and is biased downwardly to normally maintain the ball cage and large ball in the lower or inactive position. The housing contains a single fluid chamber which, when pressurized, causes the ball cage and large ball to move to the active or upper position in opposition to the biasing means.

BRIEF DESCRIPTION OF THE DRAWINGS

The character of the invention, however, may be best understood by reference to the accompanying drawings, in which.

DETAILED DESCRIPTION OF THE INVENTION

Figure 1:
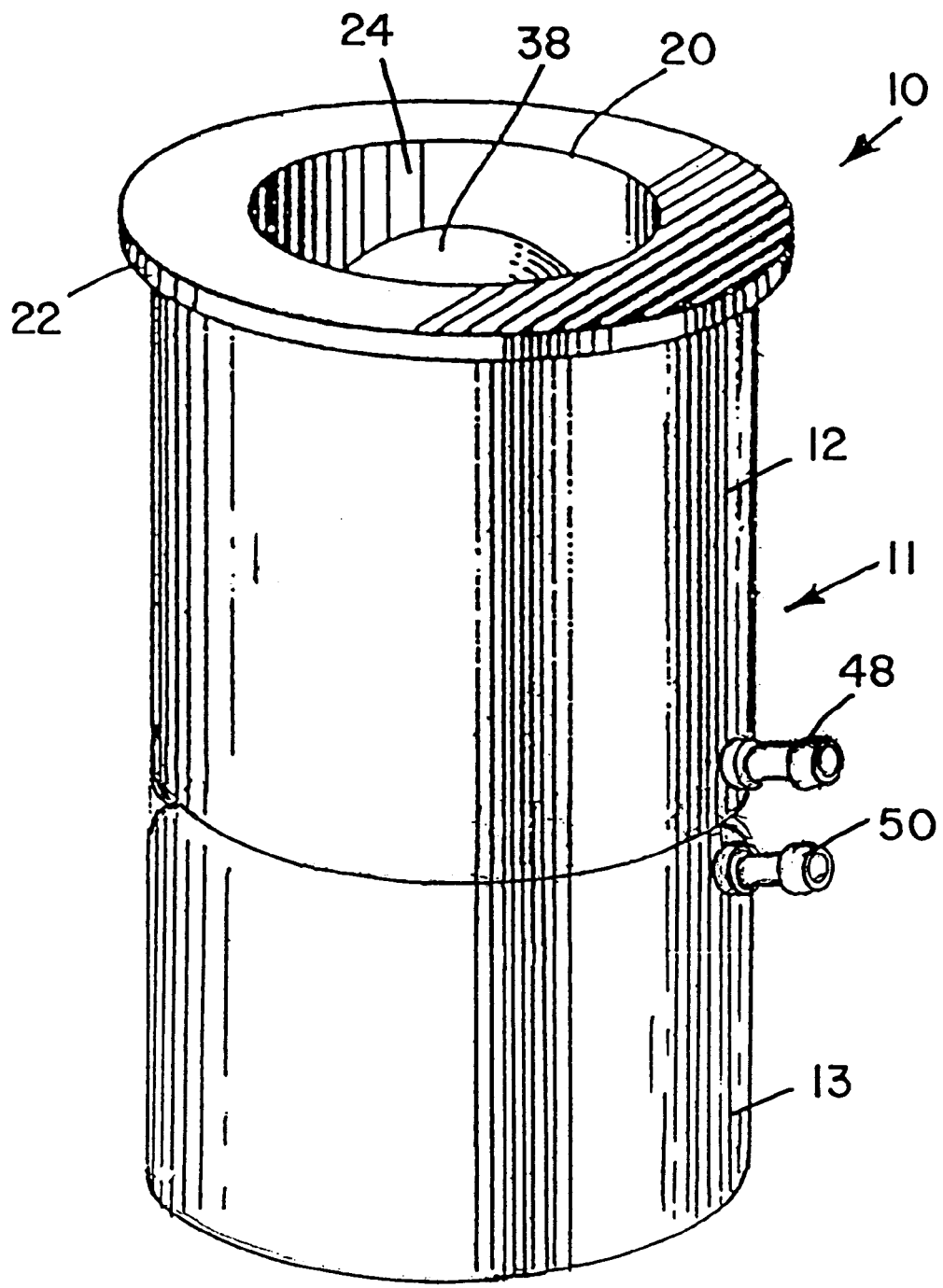
FIG. 1 is an isometric perspective view of a first embodiment of a ball-type of anti-friction device, embodying the principles of the present invention.
Figure 2:
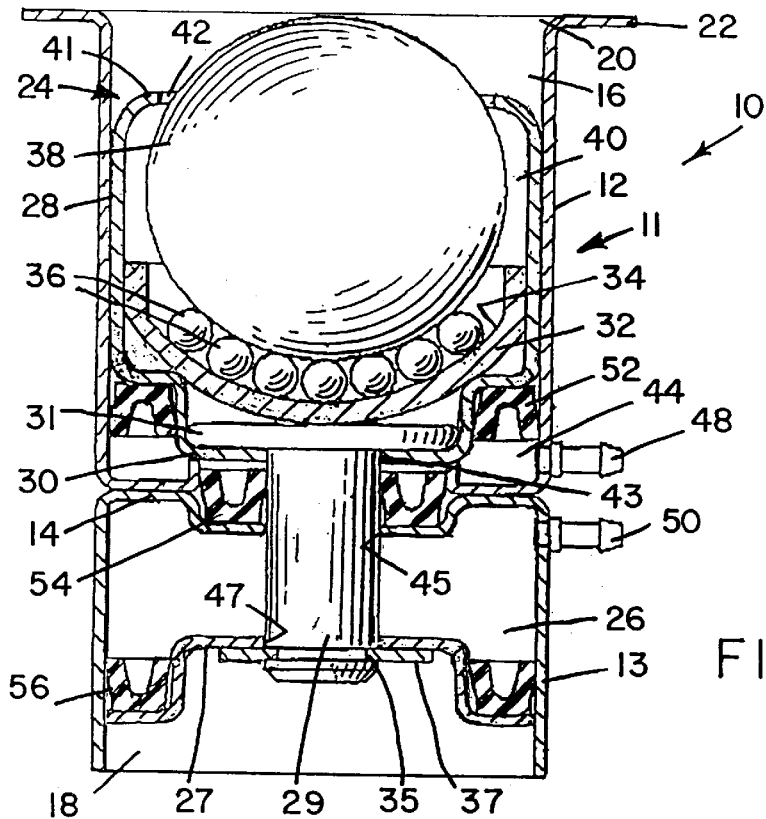
FIG. 2 is a vertical cross-sectional view of the device of FIG. 1, showing the device in the inactive position.
Figure 3:
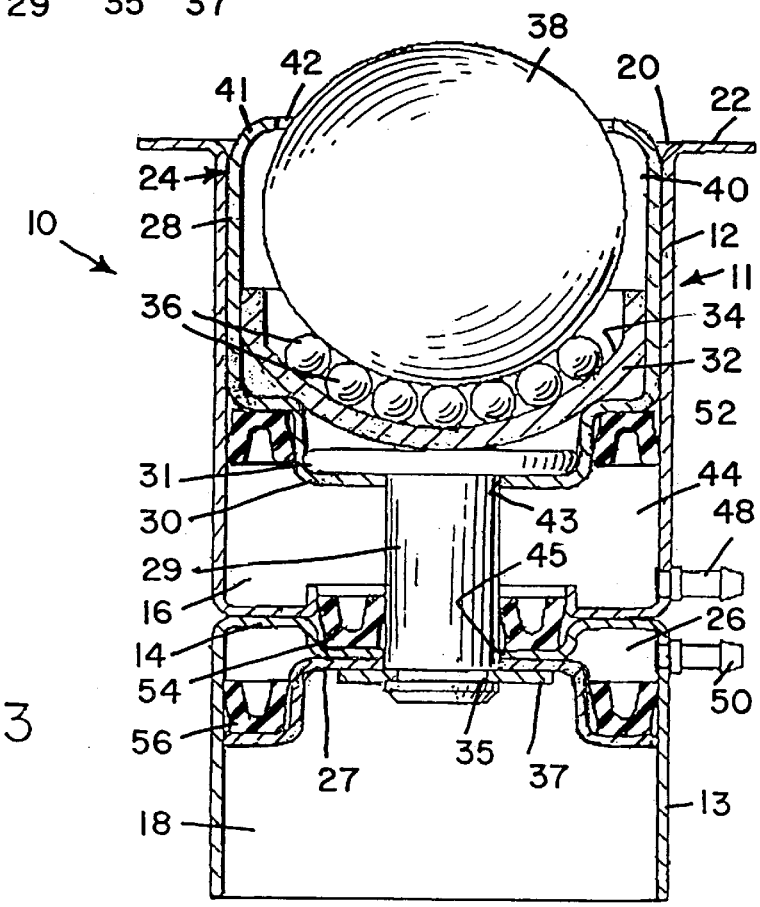
FIG. 3 is a view similar to FIG. 2, showing the device in the active position.

Referring first to FIGS. 1—3, there is shown a first embodiment of a ball-type anti-friction device of the present invention generally indicated by the reference numeral 10. The anti-friction device 10 comprises a housing generally indicated by the reference numeral 11 which contains a ball cage, generally indicated by the reference numeral 24, and a piston, generally indicated by the reference numeral 26. The housing 11 consists of an upper can-shaped portion welded or bonded to a lower can-shaped portion. The abutting ends of the two can-shaped portions define a divider wall 14. The upper can-shaped portion has a tubular cylindrical side wall 12. The lower can-shaped portion has a tubular cylindrical side wall 13. The side wall 12 defines an upper bore 16, having a top opening 20. The upper end of the side wall 12 has an annular outwardly facing horizontal flange 22. The cylindrical side wall 13 defines a lower bore 18.

The ball cage 24 comprises a cylindrical side wall 28 which lies within the side wall 12 in sliding relationship therewith, and a bottom wall 30 which has a central aperture 43. The ball cage 24 also includes a platform 32 spaced from the bottom wall 30. The platform 32 has an upper concave surface 34 which supports a plurality of small bearing balls 36 which, in turn, support a large ball 38. The small balls 36 and the large ball 38 are located within an upper cavity 40 which is defined by the cylindrical side wall 28. The upper end of the side wall 28 has an inwardly extending annular flange 41 which defines a top opening 42. The top opening 42 has a smaller diameter then that of the large ball 38 for retaining the ball 38 within the chamber 40. Small balls 36 enable the large ball 38 to roll in that direction relative to the ball cage 24.

The piston 26 includes a wall 27 which has a central aperture 47 and a stud 29 which extends through the aperture 47. The upper end of the stud 29 has a disk-shaped head 31 which is located snugly between the bottom wall 30 and the platform 32 so that the piston 26 is fixed relative to the ball cage 24. The lower end of the stud 29 has an annular groove 35 for receiving a retaining ring 37 for retaining the lower end of the stud 29 beneath the wall 27. The walls 30 and 14 define an upper fluid chamber 44. The walls 14 and 27 define a lower fluid chamber 46. An upper fluid fixture 48 is connected to the upper chamber 44. A lower fluid fixture 50 is connected to the lower chamber 46. An upper sealing ring 52 is located within the upper fluid chamber 44 for maintaining a fluid seal between the cylindrical wall 28 of the ball cage and the cylindrical wall 12 of the housing. An intermediate sealing ring 54 is located above the wall 14 about the stud 29 to provide a fluid seal between the upper fluid chamber 44 and the lower fluid chamber 46. A lower sealing ring 56 is located in the lower fluid chamber 46 to provide a fluid seal between the piston 26 and the cylindrical wall 13 of the housing.

The anti-friction device 10 is located in its normal inactive position as shown in FIG. 2, wherein the upper fluid chamber 44 is depressurized and the lower fluid chamber 46 is pressurized. This maintains the piston 26 in its lower position as shown in FIG. 2, so that the top of the large ball 38 is below the upper surface of the flange 22. The anti-friction device 11 is actuated to its active position by depressurizing the lower fluid chamber 46 and pressurizing the upper fluid chamber 44. This causes the piston 26 to move upwardly relative to the housing 11 so that the top of the ball extends above the upper surface of the flange 22, as shown in FIG. 3.

Figure 4:
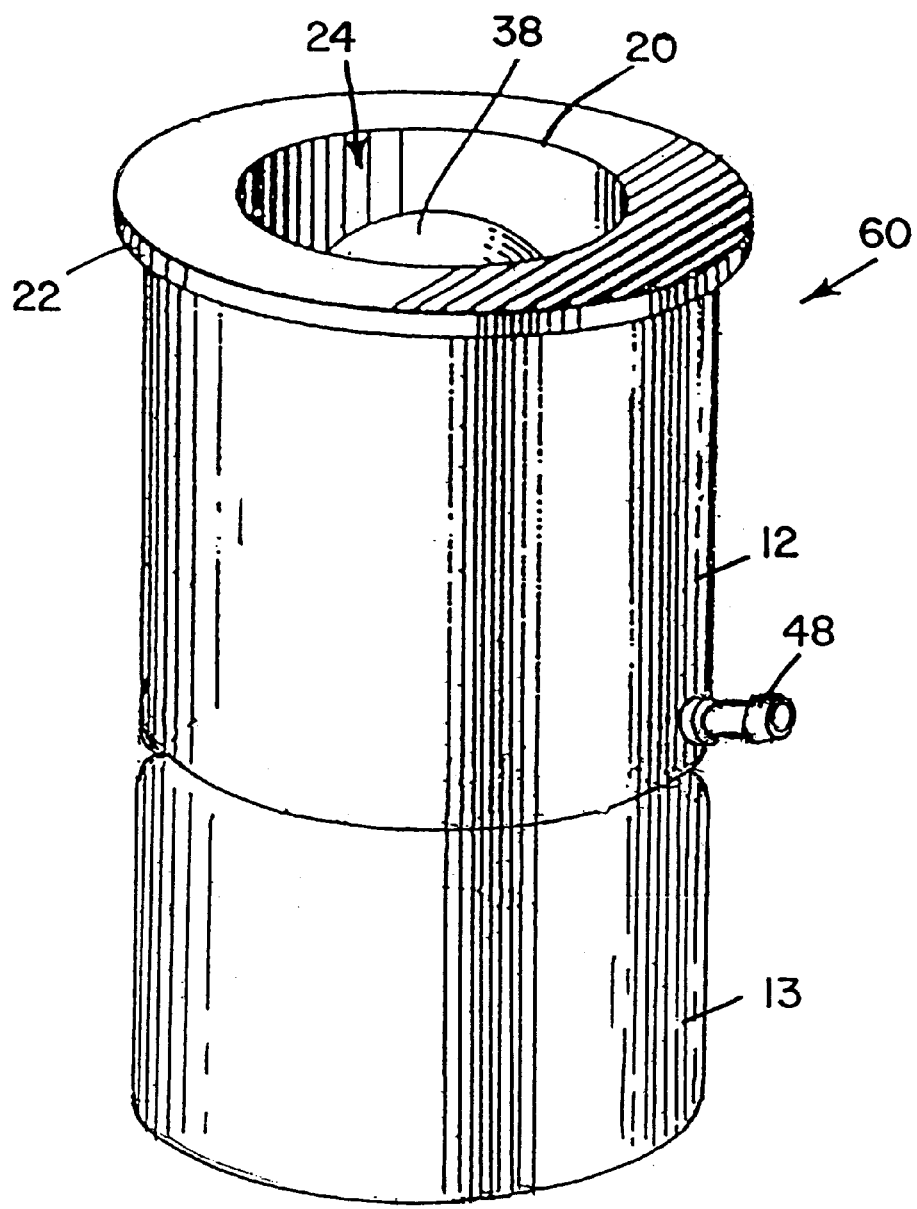
FIG. 4 is an isometric view of a second embodiment of the invention.
Figure 5:
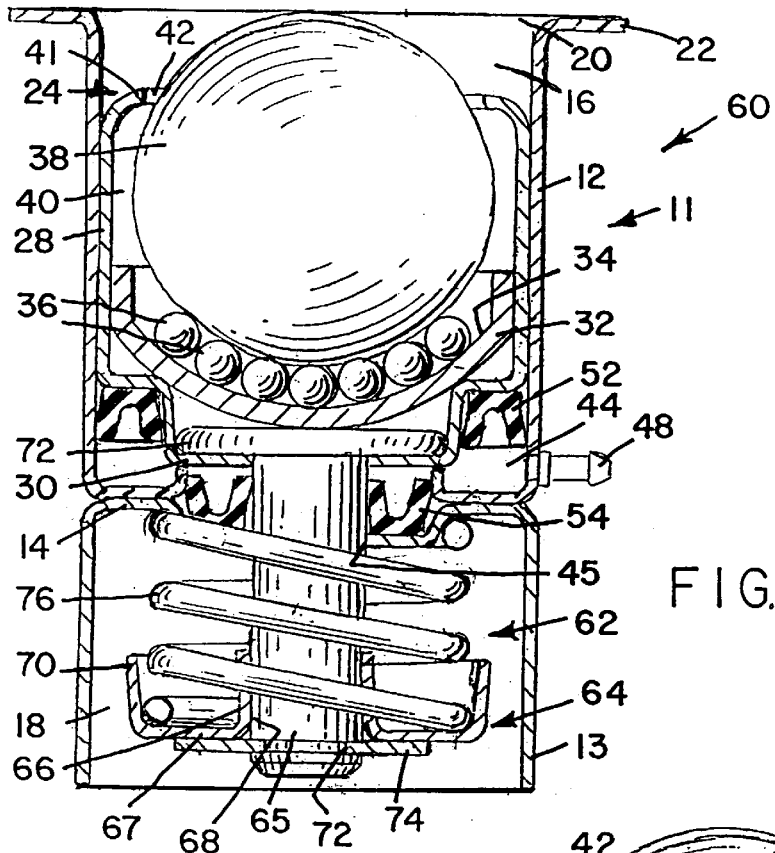
FIG. 5 is a vertical cross-sectional view of the second embodiment, showing the device in the inactive position.
Figure 6:
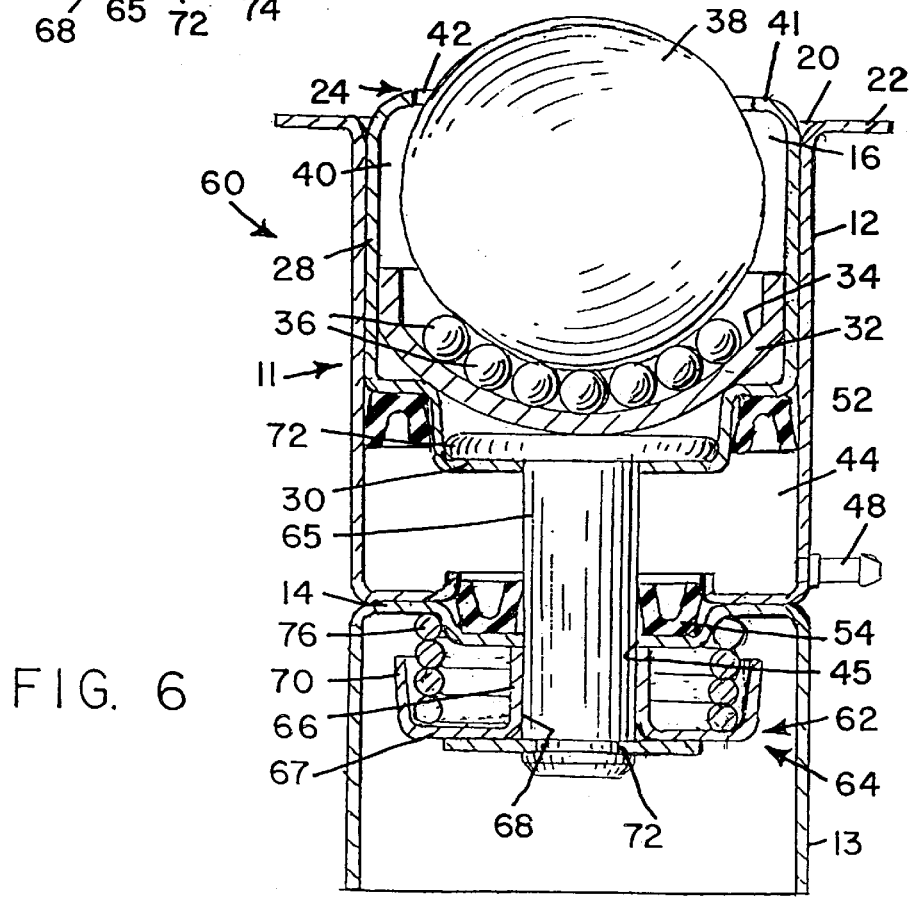
FIG. 6 is a view similar to FIG. 5, showing the device of the second embodiment in the active position.

Referring to FIGS. 4–6, there is shown a second embodiment of a ball-type anti-friction device of the present invention and generally indicated by the reference numeral 60. The anti-friction device 60 includes the same housing 11 which has been described in connection with the first embodiment 10, except that it does not include the lower fluid fixture 50. The second embodiment 60 also includes the ball carriage 24, small balls 36, and large ball 38 which form part of the first embodiment 10. The second embodiment 60 differs from the first embodiment 10 primarily in the details of the fluid piston. The fluid piston of the second embodiment 60 is generally indicated by the reference numeral 62 and includes a toroidal-shaped cup, generally indicated by the reference numeral 64, and a stud 65. The toroidal-shaped cup 64 has a cylindrical inner wall 66 which has a central bore 68 and a generally cylindrical outer wall 70 which is concentric with the inner wall 66. Stud 65 extends through the apertures 68 and has a head portion 72 which lies snugly between the upper wall 30 and the platform 32. The lower end of the stud 65 has an annular groove 72 for receiving a retaining ring 74 for maintaining the lower end of the stud 65 below the bottom wall 67 of the cup 64. A compression spring 76 surrounds the stud 65. The lower end of the compression spring 76 lies between the outer and inner walls 70 and 66, respectively. The spring 76 extends from the bottom wall 67 of the cup 64 to the divider wall 14 of the housing and normally bias the distance 64 to the lower position which positions the larger ball 38 below the upper surface of the flange 22 as shown in FIG. 5. The anti-friction device 60 is rendered to its active position by pressurizing the upper fluid chamber 44. This forces the ball cage 24 upwardly against the bias of the spring 76. Since the piston 65 is fixed relative to the ball cage 24, the piston 65 also moves upwardly and compresses the spring 76, as shown in FIG. 6. When the ball cage 24 is in its outer position, as shown in FIG. 6, the ball 38 extends above the upper surface of the flange 22. The seals 52 and 54 are retained in the second embodiment 60 and function in the same manner as the seals 52 and 54 in the first embodiment 10. The second embodiment 60 does not require the lower seal 56.

The invention having been thus described, what is claimed as new desired to be secured by Letters Patent is:

1. A ball-type anti-friction mechanism comprising:
   (a) a housing having a chamber and a top opening to the chamber, said housing having a horizontal bottom wall which has a vertical aperture;
   (b) a ball cage mounted within said chamber for movement between a lower position and an upper position, said ball cage having an upper opening and defining a compression chamber between said bottom wall and said ball cage;
   (c) a ball mounted for universal rotation within said ball cage so that a minor portion of said ball extends above said upper opening, said ball being below said top opening when said ball cage is in said lower position and a minor portion of said ball being above said top opening when said ball cage is in said upper position; and
   (d) a fluid actuator for selectively positioning said ball cage in one of said upper and lower positions, said fluid actuator comprising:
      (1) a piston which is slidably mounted in the aperture of said bottom wall, said piston having a lower end and an upper end, said upper end being fixed to said ball cage;
      (2) a fluid fixture operatively connected to said compression chamber for moving said ball cage to said upper position; and
      (3) a return actuator for moving said ball cage to said lower position.

2. A ball-type anti-friction mechanism comprising:
   (a) a housing having a chamber and a top opening to the chamber;
   (b) a ball cage mounted within said chamber for movement between a lower position and an upper position, said ball cage having an upper opening;
   (c) a ball mounted for universal rotation within said cage so that a minor portion of said ball extends above said upper opening, said ball being below said top opening when said ball cage is in said lower position and a minor portion of said ball being above said top opening when said ball cage is in said upper position; and
   (d) a double acting fluid actuated piston and cylinder mechanism for positively and selectively positioning said ball cage in one of said upper and lower positions.

3. A ball-type anti-friction mechanism as recited in claim 2, wherein said double acting piston and cylinder mechanism comprises:
   (a) a cylinder located below said ball cage;
   (b) a horizontal dividing wall between said cylinder and said ball cage, said dividing wall having a vertical aperture;
   (c) a piston head slidably mounted within said cylinder below said dividing wall so that a first compression chamber is formed within said cylinder between said ball cage and said dividing wall and a second compression chamber is formed between said dividing wall and said piston head;
   (d) a stud slidably mounted in said aperture, said stud having an upper end fixed to said ball cage and a lower end fixed to said piston head;
   (e) a first fluid fixture operatively connected to said first compression chamber for moving said ball cage to said upper position; and
   (f) a second fluid fixture operatively connected to said second compression chamber for moving said ball cage to said lower position.

4. A ball-type anti-friction mechanism as recited in claim 3, further comprising:
   (a) an upper sealing ring for forming a sliding seal between said ball cage and said housing;

(b) a lower sealing ring for forming a sliding seal between said piston head and said cylinder; and (c) an intermediate sealing ring at said vertical aperture for forming a sliding seal between said stud and said dividing wall.

5. A ball-type anti-friction mechanism comprising:

(a) a housing having a chamber and a top opening to the chamber;

(b) a ball cage mounted within said chamber for movement between a lower position and an upper position, said ball cage having an upper opening;

(c) a ball mounted for universal rotation within said ball cage so that a minor portion of said ball extends above said upper opening, said ball being below said top opening when said ball cage is in said lower position and a minor portion of said ball being above said top opening when said ball cage is in said upper position; and (d) a fluid actuator for selectively positioning said ball cage in one of said upper and lower positions, said fluid actuator comprising:

(1) a horizontal wall below said ball cage for forming a compression chamber between said ball cage and said wall, said wall having a vertical aperture;

(2) a fluid fixture operatively connected to said compression chamber;

(3) a compression spring located below said wall, said compression spring having an upper end and a lower end; and (4) a stud which is slidably mounted in the aperture of said wall, said stud having an upper end and a lower end, the upper end of said stud being fixed to said ball cage and the lower end of said stud being operatively connected to the lower end of said compression spring so that said stud and said ball cage are biased downwardly to said lower position by said compression spring.

6. a ball-type anti-friction device as recited in claim 5 further comprising:

(a) a stop secured to the lower end of said stud; and (b) a cup shaped retainer which rests on said stop and which has a top opening, the lower end of said compression spring being located within said cup shaped retainer and from said retainer to said horizontal wall.

7. A ball-type anti-friction device as recited in claim 6, wherein the lower end of said stud has a horizontal groove and wherein said stop is a retaining ring located in said groove.

\* \* \* \* \*